US009847010B2

(12) United States Patent
Pham et al.

(10) Patent No.: US 9,847,010 B2
(45) Date of Patent: Dec. 19, 2017

(54) FALL PROTECTION HARNESS WITH DAMAGE INDICATOR

(71) Applicant: Honeywell International Inc., Morris Plains, NJ (US)

(72) Inventors: Hai D. Pham, Eden Prairie, MN (US); Steve D. Huseth, Plymouth, MN (US); Amit Kulkarni, Medina, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/962,833

(22) Filed: Dec. 8, 2015

(65) Prior Publication Data

US 2017/0162025 A1 Jun. 8, 2017

(51) Int. Cl.
*G01B 21/18* (2006.01)
*G08B 21/18* (2006.01)

(52) U.S. Cl.
CPC .................................... *G08B 21/18* (2013.01)

(58) Field of Classification Search
None
See application file for complete search history.

(56) References Cited

U.S. PATENT DOCUMENTS 5,259,833 A * 11/1993 Barnett .................... A61F 5/026 2/44
5,481,919 A * 1/1996 Brandt, Jr. ............ G01L 9/0076 250/231.19
6,006,860 A 12/1999 Bell
6,256,789 B1 * 7/2001 Young ................ A41D 13/0007 182/3
7,091,932 B2 * 8/2006 Astrauskas ......... A47L 15/4293 340/815.45
7,106,205 B2 9/2006 Graef et al.
8,556,020 B2 * 10/2013 Rodemer ................ B60R 22/12 180/272

(Continued)

FOREIGN PATENT DOCUMENTS

AU 2006207863 A1 9/2007
WO WO-2014199341 A1 12/2014

OTHER PUBLICATIONS

"Iknaia Asset and Personnel Tracking Management System for the Construction Industry", [online]. Retrieved from the Internet: <URL http://www.iknaia.co.uk/wp-content/uploads/2014/09/Iknaia-Construction.pdf, (2014), 8 pgs.

(Continued)

*Primary Examiner* — Travis Hunnings
*Assistant Examiner* — Chico A Foxx
(74) *Attorney, Agent, or Firm* — Schwegman Lundberg & Woessner, P.A.

(57) ABSTRACT

A fall protection harness includes a computer processor, an optical transmitter, and an optical receiver coupled. The optical transmitter and the optical receiver are optically coupled. Upon damage to the fall protection harness, the optical coupling between the optical transmitter and the optical receiver is broken, the computer processor senses the break in the optical coupling between the optical transmitter and the optical receiver; and the computer processor generates a signal indicating the damage.

15 Claims, 6 Drawing Sheets

(56) References Cited

U.S. PATENT DOCUMENTS

| | | | | |
|---|---|---|---|---|
| 8,564,452 | B2 * | 10/2013 | Schaible | F16P 3/14 340/539.11 |
| 8,665,097 | B2 | 3/2014 | Worthington et al. | |
| 8,902,074 | B2 | 12/2014 | Landry et al. | |
| 9,327,678 | B1 * | 5/2016 | Stockmeier | B60R 22/48 |
| 2005/0083207 | A1 * | 4/2005 | Smith | G01L 5/10 340/668 |
| 2007/0182534 | A1 * | 8/2007 | Gregory | B60R 22/48 340/457.1 |
| 2008/0168952 | A1 * | 7/2008 | Morehead | A01K 27/006 119/859 |
| 2009/0310974 | A1 * | 12/2009 | Wyble | G01D 5/30 398/129 |
| 2010/0231402 | A1 * | 9/2010 | Flynt | G08B 19/00 340/679 |
| 2010/0326768 | A1 | 12/2010 | Kerstetter, Jr. | |
| 2011/0103558 | A1 * | 5/2011 | Hooten | A62B 35/04 379/37 |
| 2012/0050036 | A1 * | 3/2012 | Landry | G08B 25/016 340/540 |
| 2012/0081214 | A1 * | 4/2012 | Alan | G06Q 10/087 340/10.42 |
| 2013/0056302 | A1 | 3/2013 | Bishop | |
| 2013/0153335 | A1 * | 6/2013 | Luminet | A42B 3/046 182/112 |
| 2013/0276227 | A1 * | 10/2013 | Kenalty | A61G 1/044 5/81.1 R |
| 2014/0130372 | A1 | 5/2014 | Aveni et al. | |
| 2015/0090527 | A1 * | 4/2015 | Salour | G06K 7/10396 182/3 |
| 2015/0276521 | A1 * | 10/2015 | Moore, Jr. | A62B 35/0075 702/41 |
| 2017/0205784 | A1 | 7/2017 | Huseth et al. | |

OTHER PUBLICATIONS

"Iknaia Construction—Tracking Assets and Workers", [online]. (c) Iknaia 2014. [retrieved on Oct. 7, 2015]. Retrieved from the Internet: <URL: http://www.iknain.co.uk/construction/,(2014), 2 pgs.

"European Application Serial No. 16199209.4, Extended European Search Report dated Apr. 16, 2017", 7 pgs.

"European Application Serial No. 17150486.3, Extended European Search Report dated Mar. 28, 2017", 10 pgs.

"Radio-frequency identification—Wikipedia®", [online]. [retrieved on Dec. 17, 2015]. Retrieved from the Internet: <URL: https://web.archive.org/web/20151217225716/https://en.wikipedia.org/wiki/Radio-frequency_identification, (Dec. 17, 2015), 12 pgs.

"Safety Harnesses Get Smart", © 2006 RFID Journal, [online]. Retrieved from the Internet: <URL: http://www.rfidiournal.com/articles/view?2431>, (2006), 1 pg.

"U.S. Appl. No. 15/012,437, Notice of Allowance dated Jun. 19, 2017", 5 pgs.

"U.S. Appl. No. 15/012,437, Response filed May 24, 2017 to Non Final Office Action dated Feb. 24, 2017", 10 pgs.

"European Application Serial No. 16199209.4, Response filed Jul. 18, 2017 to Extended European Search Report dated Apr. 6, 2017", 16 pgs.

"European Application Serial No. 17153064.5, Extended European Search Report dated May 26, 2017", 6 pgs.

* cited by examiner

FALL PROTECTION HARNESS WITH DAMAGE INDICATOR

TECHNICAL FIELD

The present disclosure relates to fall protection harnesses, and in an embodiment, but not by way of limitation, a fall protection harness with a damage indicator.

BACKGROUND

Fall protection harnesses are critical pieces of safety equipment that are integral to preventing accidents on a job site. Fall protection harnesses provide a reliable restraint system worn by a worker that is connected to a fixed anchor point on a supporting structure, such as a building under construction. Fall protection harnesses are designed to arrest a fall of a worker quickly and safely. However, when a fall occurs, the fall protection harness causes a worker to be suspended in the fall protection harness in a potentially dangerous predicament. If there is no ladder or scaffolding for the worker to climb back onto, the worker will remain suspended until additional rescue help can be rendered. Being suspended in the fall protection harness for an extended period of time can lead to serious injury or death. Consequently, a rapid response is crucial to the safety of the worker. Also, a fall protection harness can be damaged or compromised when a fall occurs. Such damage should be brought to the attention of the proper person or authority, and the fall protection harness should be inspected and/or retired from use.

DETAILED DESCRIPTION

Figure 1:
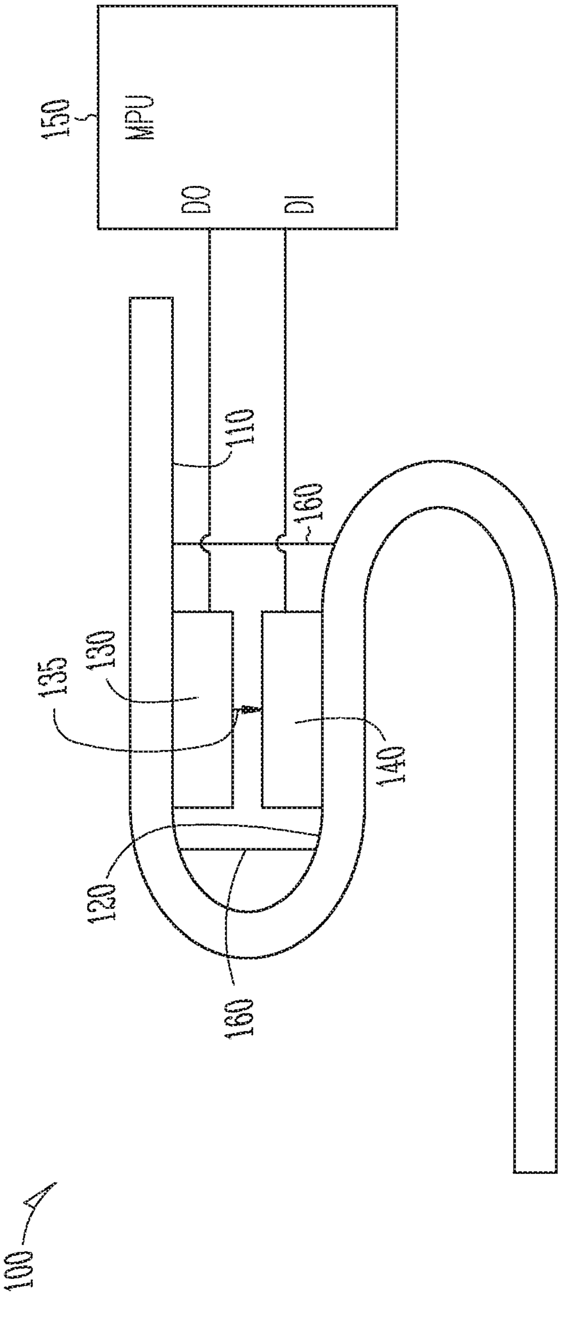
FIG. 1 illustrates a damage indicator coupled to a fall protection harness before any damage has occurred to the fall protection harness.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

An embodiment includes a sensor that is integrated into or attached to a fall protection harness. The sensor is capable of automatically sensing damage to the fall protection harness and/or a fall by a person wearing the fall protection harness. When damage is sensed, the fall protection harness can be examined to determine if it is still fit for further use, and when a fall is detected, a responsible person can be immediately notified of the fall event so that the person in the harness can be assisted. Notifying a responsible person of a fall event reduces the response time for help to arrive and consequently reduces the amount of time the person is suspended in the fall protection harness.

In an embodiment, a fall protection harness is constructed of nylon straps. At key locations on the harness, the nylon strap is folded over and attached (e.g., by sewing) onto itself to create a damage or fall indicator. In an embodiment, the damage or fall indicator is a paired optical transmitter and optical receiver embedded by sewing them into the damage or fall indicator. Consequently, for example, when a worker falls from a height, the stitching of the damage or fall indicator breaks, thereby causing a break in the optical coupling between the optical transmitter and the optical receiver. The damage to the fall protection harness can also cause a misalignment of the optical transmitter and/or optical receiver or actual damage to the optical transmitter and/or optical receiver. This break, misalignment, or damage generates a signal that is transmitted to an alarm device. A computer processor or other electronics module is attached to both the optical transmitter and optical receiver of the damage or fall indicator. When the optical coupling between the optical transmitter and the optical receiver is broken, the electronics module senses this break and generates a damage or fall alarm. The damage or fall alarm may consist of visual, acoustic, and radio frequency (RF) signals being emitted by the device that will be detected by persons and equipment in the vicinity. In the case of damage to the fall protection harness that is not caused by a fall, the proper authorities are alerted that the fall protection harness should be inspected. In response to a fall by a person wearing a fall protection harness, rapidly alerting persons in the vicinity of the fall ensures rapid extraction of the fallen worker, thereby minimizing further injury and death.

Figure 2:
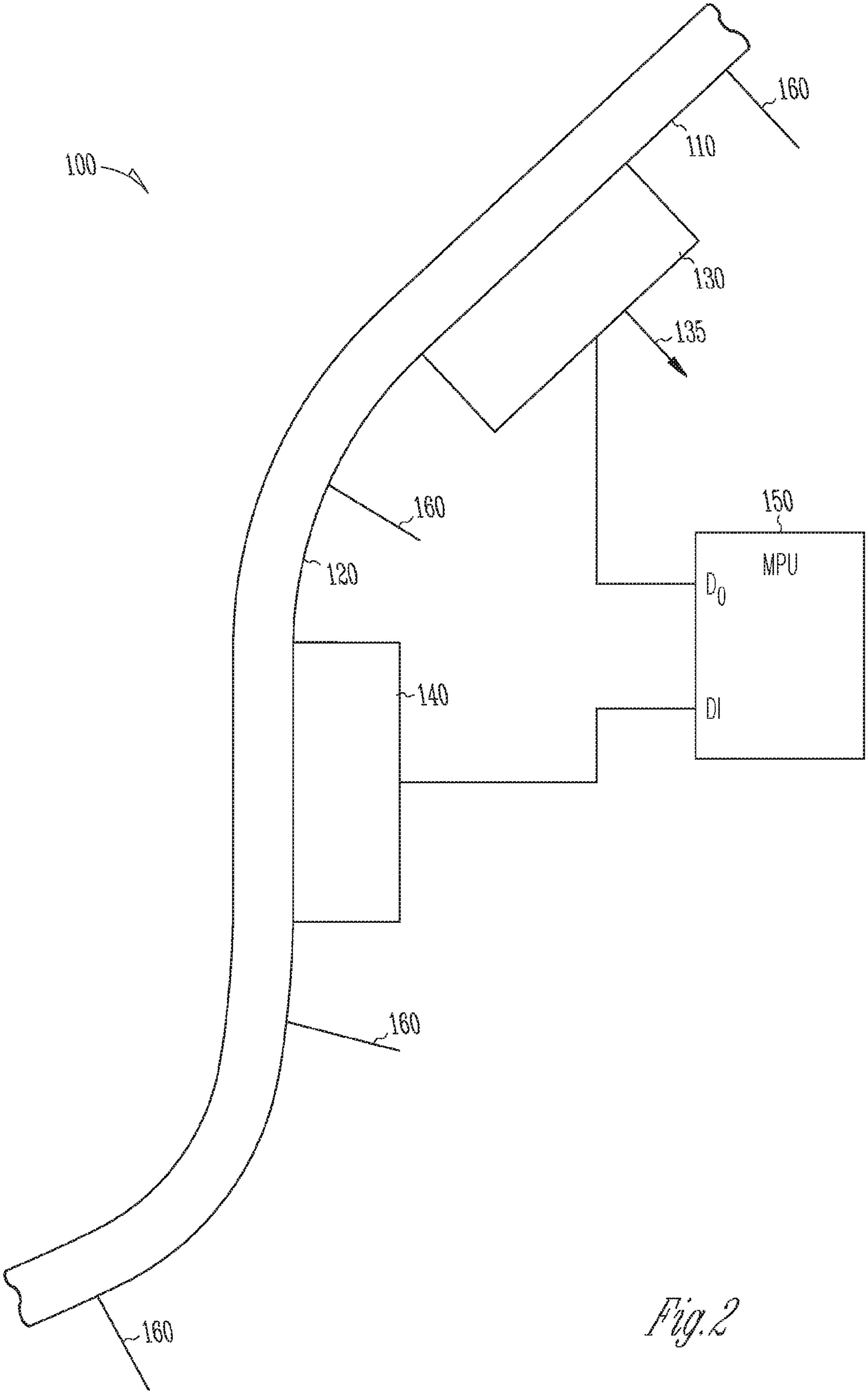
FIG. 2 illustrates a damage indicator coupled to a fall protection harness after damage has occurred to the fall protection harness.
Figure 3A:
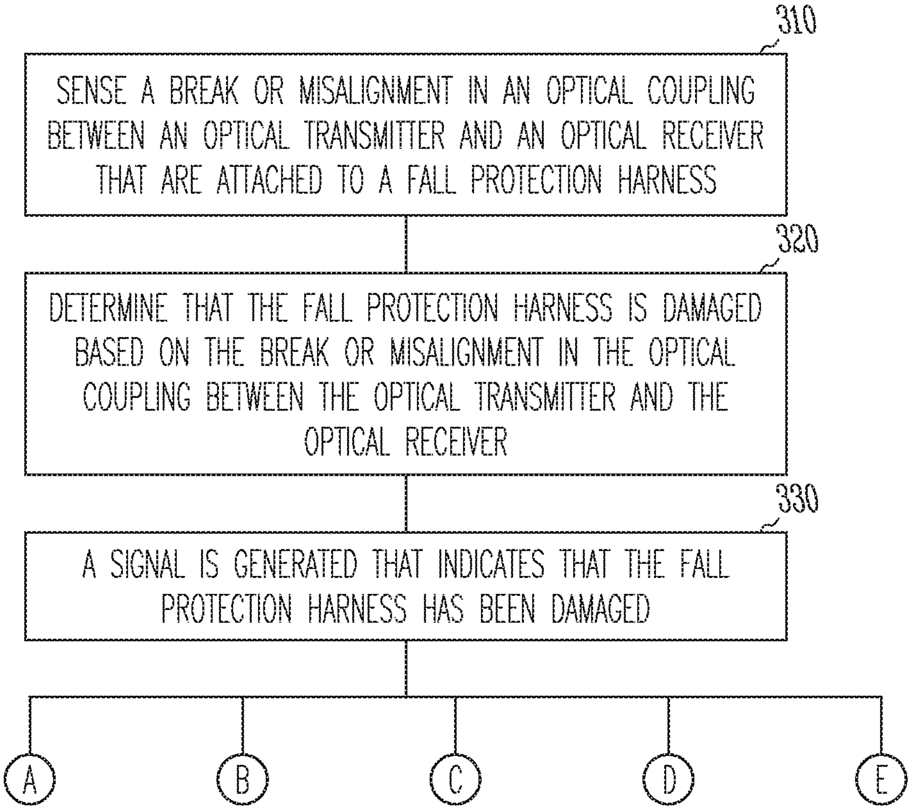
FIGS. 3A-3F illustrate features of a damage indicator for a fall protection harness.
Figure 3B:
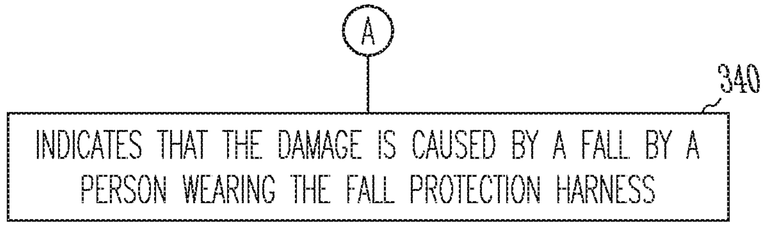
Figure 3C:
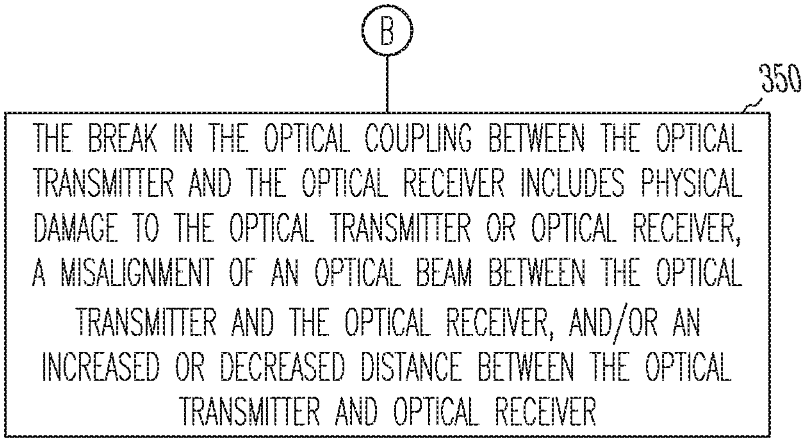
Figure 3D:
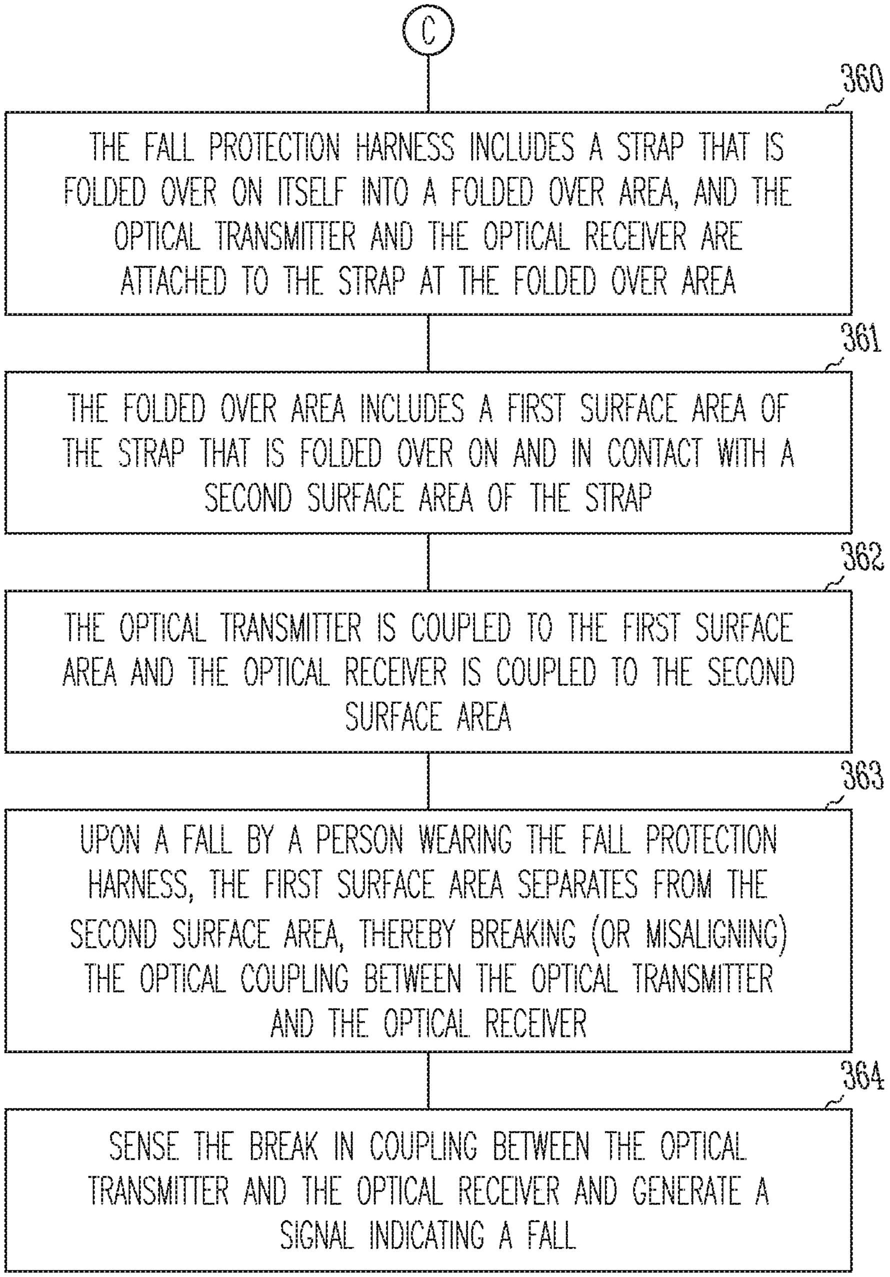
Figure 3E:
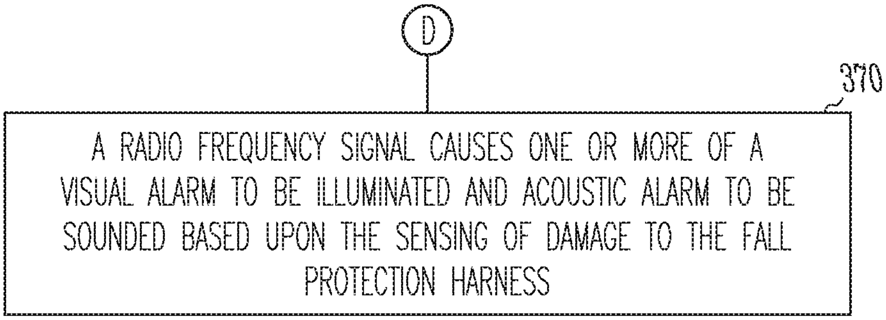
Figure 3F:
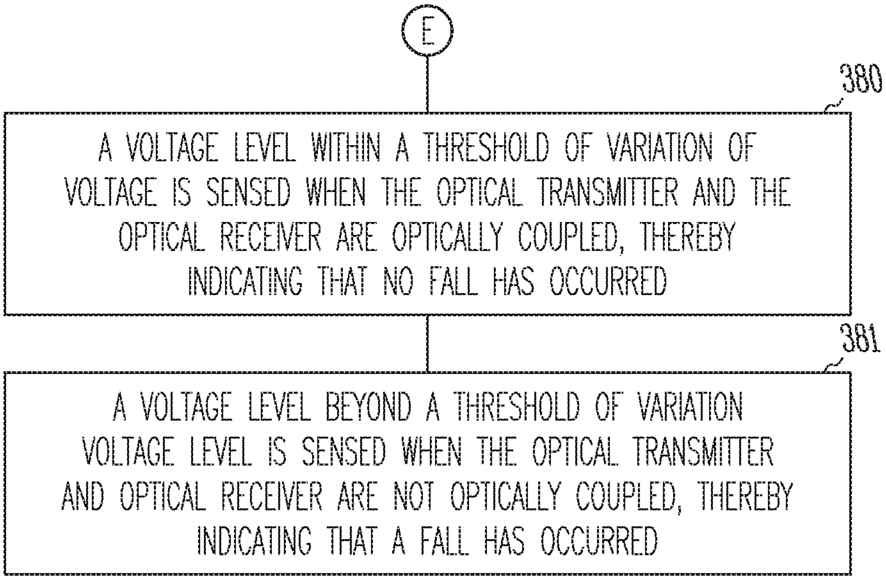

FIG. 1 illustrates a damage or fall indicator coupled to a fall protection harness before any damage has occurred to the fall protection harness, and FIG. 2 illustrates a damage or fall indicator coupled to a fall protection harness after damage has occurred to the fall protection harness. More specifically, FIGS. 1 and 2 illustrate a strap 100 of a fall protection harness. The strap is folded over on itself and attached via threading 160 or other means of attachment, thereby forming a first surface 110 and a second opposing surface 120. An optical transmitter 130 is attached to the first surface 110, and an optical receiver 140 is attached to the second opposing surface 120. When there is no damage to the fall protection harness, an optical beam 135 is transmitted by the optical transmitter 130 and received by the optical receiver 140. The optical transmitter 130 and the optical receiver 140 are coupled to a micro-processing unit 150. Specifically, the optical transmitter 130 is coupled to port DO of the micro-processing unit 150, and the optical receiver 140 is coupled to port DI of the micro-processing unit 150.

Upon a fall or other damage event to the fall protection harness, the threading 160 breaks, and the first surface 110 and the second surface 120 separate from each other, thereby also causing the optical coupling between the optical transmitter 130 and the optical receiver 140 to be broken or misaligned. FIG. 2 illustrates such a situation wherein the optical beam 135 is transmitted by the optical transmitter 130 such that it will not be sensed by the optical receiver 140. After the break or misalignment in the optical coupling between the optical transmitter 130 and the optical receiver 140, the MPU 150 senses 0 volts at the DI port. When the optical coupling between the optical transmitter 130 and the optical receiver 140 is not broken, approximately half of a volt is sensed at port DO. The condition of the optical transmitter 130 and the optical receiver 140 inside the folded over damage or fall indicator signals the MPU 150 whether damage or a fall has occurred. Once a damage or fall condition is confirmed by the MPU 150, the MPU 150 signals an alarm mechanism to illuminate a visual alarm, sound an acoustic alarm, and/or transmit RF alarm signals.

FIGS. 3A-3F are a block diagram illustrating operations and features of a damage or fall indicator for a fall protection harness. FIGS. 3A-3F include a number of blocks 310-381. Though arranged substantially serially in the example of FIGS. 3A-3F, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A-3F, at 310, a break or misalignment in an optical coupling between an optical transmitter and an optical receiver that are attached to a fall protection harness is sensed. As noted above, actual damage to the optical transmitter or optical receiver can also be sensed. At 320, it is determined that the fall protection harness is damaged based on the break or misalignment in the optical coupling between the optical transmitter and the optical receiver. At 330, a signal is generated that indicates that the fall protection harness has been damaged.

Block 340 indicates that the damage is caused by a fall by a person wearing the fall protection harness.

At 350, the break in the optical coupling between the optical transmitter and the optical receiver includes physical damage to the optical transmitter or optical receiver, a misalignment of an optical beam between the optical transmitter and the optical receiver, and/or an increased or decreased distance between the optical transmitter and optical receiver. Any of these conditions can be sensed and can indicate damage to the fall protection harness.

Block 360 indicates that the fall protection harness includes a strap. The strap is folded over on itself into a folded over area, and the optical transmitter and the optical receiver are attached to the strap at the folded over area. Block 361 illustrates that the folded over area includes a first surface area of the strap that is folded over on and in contact with a second surface area of the strap. As noted above, this first surface area and second surface area can be secured to each other by threaded stitching or other similar means. Block 362 shows that the optical transmitter is coupled to the first surface area and the optical receiver is coupled to the second surface area. Block 363 discloses that upon a fall by a person wearing the fall protection harness, the first surface area separates from the second surface area, thereby breaking (or misaligning) the optical coupling between the optical transmitter and the optical receiver. At 364, the break in coupling between the optical transmitter and the optical receiver is sensed, and a signal indicating the fall is generated.

At 370, a radio frequency signal causes one or more of a visual alarm to be illuminated and acoustic alarm to be sounded based upon the sensing of damage to the fall protection harness.

At 380, a voltage level within a threshold of variation of voltage is sensed when the optical transmitter and the optical receiver are optically coupled. The sensing of the voltage level within the threshold of variation indicates that no fall has occurred. At 381, a voltage level beyond a threshold of variation voltage level is sensed when the optical transmitter and optical receiver are not optically coupled. The sensing of the voltage level beyond the threshold of variation indicates that a fall has occurred. As noted above, when a fall has occurred, appropriate personnel can be dispatched to aid the fallen person, and the fall protection harness can be examined for damaged and/or immediately retired from use.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:

a fall protection harness;

a computer board comprising a radio frequency (RF) communication device coupled to the fall protection harness;

an optical transmitter coupled to the fall protection harness and the computer board; and an optical receiver coupled to the fall protection harness and the computer board;

wherein the optical transmitter and optical receiver are positioned on a surface of the fall protection harness;

wherein the optical transmitter and the optical receiver are optically coupled; and wherein the fall protection harness comprises a strap, the strap is folded over on itself and attached via threading into a folded over area, the threading positioned at a first location on a first side of the optical transmitter and receiver and at a second location at an opposite side of the optical transmitter and receiver, thereby maintaining the optical coupling of the optical transmitter and optical receiver, and the optical transmitter and the optical receiver are attached to the strap at the folded over area;

wherein upon damage to the fall protection harness, the optical coupling between the optical transmitter and the optical receiver is broken due to force applied on the threading's first location and/or second location, the computer board senses the break in the optical coupling between the optical transmitter and the optical receiver; and wherein the damage is caused by a fall by a person wearing the fall protection harness; and wherein the computer board generates a signal indicating the damage.

2. The system of claim 1, wherein the break in the optical coupling between the optical transmitter and the optical receiver comprises one or more of physical damage to the optical transmitter or optical receiver, a misalignment of an optical beam between the optical transmitter and the optical receiver, or an increased or decreased distance between the optical transmitter and optical receiver.

3. The system of claim 1, wherein the folded over area comprises a first surface area of the strap folded over on and in contact with a second surface area of the strap;

wherein the optical transmitter is coupled to the first surface area and the optical receiver is coupled to the second surface area;

wherein upon the fall by the person, the first surface area separates from the second surface area, thereby breaking the optical coupling between the optical transmitter and the optical receiver; and wherein the computer board is operable to sense the breaking in the optical coupling between the optical transmitter and the optical receiver and generate the signal indicating the fall.

4. The system of claim 1, wherein the signal comprises a radio frequency signal, and the radio frequency signal causes one or more of a visual alarm to be illuminated and acoustic alarm to be sounded.

5. The system of claim 1, wherein the computer board senses a voltage level within a threshold of variation of voltage when the optical transmitter and the optical receiver are optically coupled, thereby indicating that no fall has occurred.

6. The system of claim 1, wherein the computer board senses a voltage level beyond a threshold of variation voltage level when the optical transmitter and optical receiver are not optically coupled, thereby indicating that a fall has occurred.

7. A system comprising:

a fall protection harness;

a computer processor coupled to the fall protection harness;

an optical transmitter coupled to the fall protection harness and the computer processor; and an optical receiver coupled to the fall protection harness and the computer processor;

wherein the optical transmitter and optical receiver are positioned on a surface of the fall protection harness;

wherein the optical transmitter and the optical receiver are optically coupled;

wherein the fail protection harness comprises a strap, the strap is folded over on itself and attached via threading into a folded over area, the threading positioned at a first location on a first side of the optical transmitter and optical receiver and at a second location at an opposite side of the optical transmitter and optical receiver, thereby maintaining the optical coupling of the optical transmitter and optical receiver, and the optical transmitter and the optical receiver are attached to the strap at the folded over area;

wherein upon damage to the fall protection harness, the optical coupling between the optical transmitter and the optical receiver is broken due to force applied on the threading's first location and/or second location, the computer processor senses the break in the optical coupling between the optical transmitter and the optical receiver;

wherein the damage is caused by a fall by a person wearing the fall protection harness; and wherein the computer processor generates a signal indicating the damage.

8. The system of claim 7, wherein the break in the optical coupling between the optical transmitter and the optical receiver comprises one or more of physical damage to the optical transmitter or optical receiver, a misalignment of an optical beam between the optical transmitter and the optical receiver, or an increased or decreased distance between the optical transmitter and optical receiver.

9. The system of claim 7, wherein the folded over area comprises a first surface area of the strap folded over on and in contact with a second surface area of the strap;

wherein the optical transmitter is coupled to the first surface area and the optical receiver is coupled to the second surface area;

wherein upon the fall by the person, the first surface area separates from the second surface area, thereby breaking the optical coupling between the optical transmitter and the optical receiver; and wherein the computer processor is operable to sense the breaking in the optical coupling between the optical transmitter and the optical receiver and generate the signal indicating the fall.

10. The system of claim 7, wherein the signal comprises a radio frequency signal (RF), and the RF signal causes one or more of a visual alarm to illuminate and acoustic alarm to be sounded.

11. The system of claim 7, wherein the computer processor senses a voltage level within a threshold of variation of voltage when the optical transmitter and the optical receiver are optically coupled, thereby indicating that no fall has occurred.

12. The system of claim 7, wherein the computer processor senses a voltage level beyond a threshold of variation voltage level when the optical transmitter and optical receiver are not optically coupled, thereby indicating that a fall has occurred.

13. The system of claim 7, wherein the computer processor comprises a computer board comprising a radio frequency (RF) communication device.

14. A non-transitory computer readable medium comprising instructions that when executed by a processor execute a process comprising:

monitoring an optical coupling between an optical transmitter and an optical receiver, the optical transmitter and optical receiver coupled to a fall protection harness by positioning the optical transmitter and the optical receiver on a surface of the fall protection harness;

determining that the fall protection harness has been damaged by sensing that the optical coupling between the optical transmitter and the optical receiver is corrupted; and generating a signal as a function of the damage to the fall protection harness;

wherein the fall protection harness comprises a strap, the strap is folded over on itself and attached via threading into a folded over area, the threading positioned at a first location on a first side of the optical transmitter and optical receiver and at a second location at an opposite side of the optical transmitter and optical receiver, thereby maintaining the optical coupling of the optical transmitter and optical receiver, and the optical transmitter and the optical receiver are attached to the strap at the folded over area;

wherein upon damage to the fall protection harness, the optical coupling between the optical transmitter and the optical receiver is broken due to force applied on the threading's first location and/or second location, the processor senses the break in the optical coupling between the optical transmitter and the optical receiver;

wherein the damage is caused by a fall by a person wearing the fall protection harness; and wherein the processor generates a signal indicating the damage.

15. The non-transitory computer readable medium of claim 14, wherein the corruption in the optical coupling between the optical transmitter and the optical receiver comprises one or more of physical damage to the optical transmitter or optical receiver, a misalignment of an optical beam between the optical transmitter and the optical receiver, or an increased or decreased distance between the optical transmitter and optical receiver.

* * * * *